United States Patent
Iley et al.

(10) Patent No.: US 12,332,753 B2
(45) Date of Patent: Jun. 17, 2025

(54) TRANSFORMING MAINFRAME PROCESSES AND ROUTING BASED ON SYSTEM STATUS

(71) Applicant: Bank of America Corporation, Charlotte, NC (US)

(72) Inventors: Dean Alan Iley, Chesapeake, VA (US); Ashish Punekar, Concord, NC (US); Lester B. House, Jr., Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 609 days.

(21) Appl. No.: 17/498,869

(22) Filed: Oct. 12, 2021

(65) Prior Publication Data

US 2023/0115282 A1   Apr. 13, 2023

(51) Int. Cl.
| | | |
|---|---|---|
| *G06F 11/20* | (2006.01) | |
| *G06F 9/46* | (2006.01) | |
| *G06F 9/48* | (2006.01) | |
| *G06F 9/50* | (2006.01) | |
| *G06F 11/14* | (2006.01) | |
| *G06F 11/30* | (2006.01) | |

(52) U.S. Cl.
CPC ............ *G06F 11/202* (2013.01); *G06F 9/466* (2013.01); *G06F 9/4881* (2013.01); *G06F 9/5038* (2013.01); *G06F 9/5083* (2013.01); *G06F 11/1438* (2013.01); *G06F 11/3055* (2013.01)

(58) Field of Classification Search
CPC ...... G06F 9/4881; G06F 9/466; G06F 9/5038; G06F 9/5083; G06F 11/1438; G06F 11/3055; G06F 11/202
See application file for complete search history.

(56) References Cited

U.S. PATENT DOCUMENTS

| | | |
|---|---|---|
| 6,173,311 B1 | 1/2001 | Hassett et al. |
| 6,332,163 B1 | 12/2001 | Bowman-Amuah |
| 7,020,697 B1 | 3/2006 | Goodman et al. |
| 7,289,964 B1 | 10/2007 | Bowman-Amuah |
| 7,382,773 B2 | 6/2008 | Schoeneberger et al. |
| 7,467,198 B2 | 12/2008 | Goodman et al. |
| 8,429,630 B2 | 4/2013 | Nickolov et al. |
| 9,578,088 B2 | 2/2017 | Nickolov et al. |
| 9,715,222 B2 | 7/2017 | Zimmermann et al. |
| 10,212,614 B2 | 2/2019 | Tujkovic |
| 10,324,430 B2 | 6/2019 | Geffin |
| 10,548,030 B2 | 1/2020 | Tujkovic |
| 10,572,186 B2 | 2/2020 | Sicola et al. |

(Continued)

*Primary Examiner* — Jacob D Dascomb

(57) ABSTRACT

A mainframe processing system comprises a memory operable to store data transformation instructions and one or more processors, at least one of the one or more processors operably coupled to the memory. The one or more processors are configured to receive batch processing data from one or more data sources, transform the batch processing data into a plurality of mainframe processes based on the data transformation instructions, and dispatch each mainframe process to a respective mainframe site. The batch processing data received by the processor indicates a plurality of batch processes formatted for mainframe processing as a batch. Each batch process is transformed to a respective mainframe process formatted for mainframe processing on an individual basis.

20 Claims, 4 Drawing Sheets

(56) References Cited

U.S. PATENT DOCUMENTS

| | | | |
|---|---|---|---|
| 10,733,053 | B1 | 8/2020 | Miller et al. |
| 10,853,146 | B1 | 12/2020 | Talayco |
| 11,075,929 | B1 | 7/2021 | Li et al. |
| 11,089,492 | B2 | 8/2021 | Tujkovic |
| 11,275,608 | B1 * | 3/2022 | Natarajan ............. G06F 9/4843 |
| 2006/0059253 | A1 | 3/2006 | Goodman et al. |
| 2009/0276771 | A1 | 11/2009 | Nickolov et al. |
| 2010/0235431 | A1 * | 9/2010 | Poluri ................. G06F 11/2071 |
| | | | 714/4.11 |
| 2011/0137790 | A1 * | 6/2011 | Hou ........................ H04L 45/00 |
| | | | 709/227 |
| 2014/0039683 | A1 | 2/2014 | Zimmermann et al. |
| 2014/0040343 | A1 | 2/2014 | Nickolov et al. |
| 2016/0357605 | A1 * | 12/2016 | Keinath ................... H04L 67/34 |
| 2017/0195899 | A1 | 7/2017 | Tujkovic |
| 2017/0336768 | A1 | 11/2017 | Geffin |
| 2017/0344971 | A1 | 11/2017 | Kargman et al. |
| 2019/0187934 | A1 | 6/2019 | Sicola et al. |
| 2019/0281474 | A1 | 9/2019 | Tujkovic |
| 2019/0370012 | A1 | 12/2019 | Sears et al. |
| 2020/0026786 | A1 * | 1/2020 | Cadarette ............ G06F 16/2365 |
| 2020/0067789 | A1 | 2/2020 | Khuti et al. |
| 2020/0120516 | A1 | 4/2020 | Tujkovic |
| 2020/0393993 | A1 | 12/2020 | Sicola et al. |
| 2021/0064234 | A1 | 3/2021 | Zhang et al. |

\* cited by examiner

TRANSFORMING MAINFRAME PROCESSES AND ROUTING BASED ON SYSTEM STATUS

TECHNICAL FIELD

The present disclosure relates, in general, to mainframe processing and, more specifically, to transforming mainframe processes and routing based on system status.

BACKGROUND

A mainframe computer or "mainframe" is a computer that typically has more processing power than some other classes of computers, such as workstations or personal computers. A mainframe computer may be used for large-scale data processing, such as batch processing. Batch processing involves the processing of a number of processes in a group referred to as a batch. Batch processing jobs may be run at regularly scheduled times (e.g., overnight) or on an as-needed basis. Once batch processing is underway, the batch processing may be completed without requiring user interaction. This differentiates batch processing from per-transaction processing where one process is processed at a time based on a corresponding request.

SUMMARY

The system disclosed in the present application provides a technical solution to technical problems. As an example, existing techniques for handing batch processing data involve receiving the batch processing data from a data source and inputting the batch processing data into a mainframe for processing. Inputting the batch processing data into the mainframe can lead to certain problems. Suppose a mainframe site, such as a datacenter, hosts an active instance of the mainframe. If the mainframe site loses power or otherwise becomes unavailable, the active instance of the mainframe may be re-located to a backup mainframe site. For example, if a weather event in one geographical area causes the mainframe site to unexpectedly become unavailable, the active instance of the mainframe may be relocated to a backup mainframe site in a different geographical area not impacted by the weather event. Re-routing the batch processing data to the backup mainframe site tends to be time-consuming, particularly for systems that handle large volumes of batch processing data, such as thousands of batch processes per day. These delays can be hours-long and are particularly problematic for systems that require high availability. Furthermore, re-routing the batch processing data often introduces errors. Batch processing data is designed to be processed uninterrupted. For example, batch processing data does not require system or user interaction to proceed from processing one batch process in the batch to the next. If an interruption occurs in the middle of processing the batch processing data, for example, due to relocating the mainframe during an unexpected outage, errors can occur. These errors can be unpredictable and often require manual review, restart, or repair.

The system disclosed in the present application provides a technical solution to this technical problem by providing techniques for transforming the batch processing data to facilitate re-routing the processing in real-time. The system receives batch processing data from one or more data sources. The batch processing data indicates a plurality of batch processes formatted for mainframe processing as a batch. The system transforms the batch processing data into a plurality of mainframe processes. Each mainframe process corresponds to one of the plurality of batch processes of the batch processing data. Each mainframe process is formatted for mainframe processing on an individual basis (as opposed to as a group/batch). The system sends the plurality of mainframe processes to a traffic manager configured to route each mainframe process to a respective mainframe site of a plurality of mainframe sites (each mainframe site comprises one or more mainframes).

The disclosed system provides several practical applications and technical advantages, which include a process for re-routing one or more mainframe processes in real-time based on the current availability/location of the mainframe. Re-routing the one or more mainframe processes provides the technical advantage of improving the speed and accuracy with which the mainframe processes the mainframe processes. More specifically, this process determines to route mainframe processes to a mainframe site, for example, based on geographical proximity. This process further determines that the mainframe has become unavailable at the mainframe site, for example, if the mainframe site loses power in a weather event. This process determines that the mainframe has become active at a backup mainframe site and re-routes one or more remaining mainframe processes to the backup mainframe site for processing by the re-located mainframe. Each mainframe process may be routed independently of the other mainframe processes, which allows for re-routing each mainframe process in real-time. Existing techniques are typically limited to only re-routing mainframe processing data in its entirety (as a batch). As discussed above, this can be time-consuming and error prone. In contrast, the disclosed process provides a practical application by improving the speed at which processing can be re-routed. The disclosed process provides another practical application by improving the accuracy of the re-routed processing. For example, because each mainframe process can be processed independently of the other mainframe processes, the disclosed process avoids the problem that occurs with batch processing (where re-locating the mainframe mid-batch can potentially impact many thousands or even hundreds of thousands of batch processes, thereby introducing errors that require manual review, restart, or repair).

These practical applications not only improve the system's processing ability, but also improve the underlying network and the devices within the network. For example, network overhead may be reduced, for example, by efficiently re-routing mainframe processes or avoiding a need to restart processing a voluminous batch processing job. Additionally, certain embodiments dynamically scale-up and scale-down the computing resources used to receive batch processing data, transform the batch processing data, and send the batch processing data to the traffic manager. The determination to scale-up or scale-down is based on the current needs of the system, such as based on the amount of batch processing data provided by data sources. When computing resources are not required for the disclosed process, the computing resources can be allocated to other processes. In this manner, embodiments of the disclosed process allows for efficient use of computing resources.

According to certain embodiments, a mainframe processing system comprises a memory operable to store data transformation instructions and one or more processors, at least one of the one or more processors operably coupled to the memory. The one or more processors are configured to receive batch processing data from one or more data sources, transform the batch processing data into a plurality of mainframe processes based on the data transformation instructions, and dispatch each mainframe process to a respective mainframe site. The batch processing data received by the processor indicates a plurality of batch processes formatted for mainframe processing as a batch. Each batch process is transformed to a respective mainframe process formatted for mainframe processing on an individual basis.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
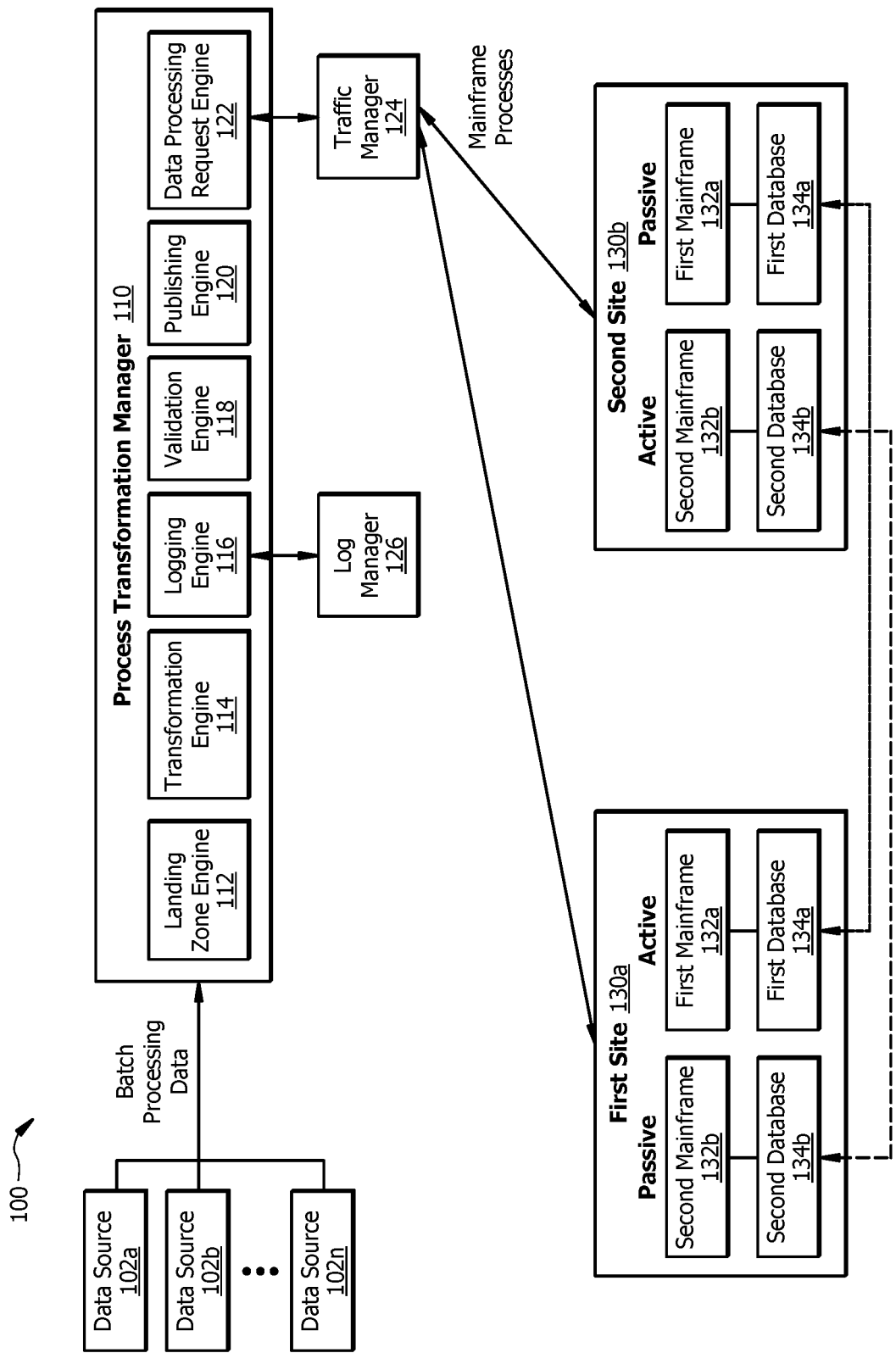
FIG. 1 is a schematic diagram of a mainframe processing system, in accordance with certain embodiments.

Certain embodiments of the present disclosure may facilitate re-routing processes associated with a mainframe batch process based on a status of a system, such as the status of a datacenter or a mainframe computer. For example, an organization may operate in multiple datacenters. Problems can occur when one of the datacenters becomes unavailable. A datacenter may become unavailable for various reasons, such as a system failure (e.g., datacenter down), an outage (such as loss of power or loss of network connectivity), performance degradation due to overload condition or another condition impacting performance, etc. As an example, suppose a weather event, such as a storm or a freeze event, causes the datacenter to lose access to power. This may occur if the power grid goes down and backup power sources become unavailable, such as when fuel for a backup generator becomes unavailable due to the weather event. In such a scenario, it would be beneficial to move the operations of the unavailable datacenter to the site of an available datacenter, such as another datacenter located in a geographical area not impacted by the weather event. Certain types of applications may be properly architected to move from the unavailable datacenter to the available center in real-time (in a matter of minutes). However, existing mainframe batch processing operations do not travel well, if at all. Relocating mainframe batch processing operations from one datacenter to another involves significant delay. In some cases, mainframe batch processing may need to be paused for hours while relocating the datacenter. Even after recovery, unresolved processes may require manual review, repair, or restart.

Due to the complexity associated with relocating mainframe batch processing operations, system administrators typically schedule a relocation procedure to take place at a low impact time of day. Scheduling the relocation procedure to take place at a low impact time of day may reduce the manual efforts required to review, repair, and restart. However, certain unexpected events (such as weather events) may require preforming the relocation procedure without sufficient time to prepare. As a result, the batch processes may end in a partial-execution state, which can cause the batch processing operation to behave in an unpredictable manner. This is an industry wide problem, especially for data that requires absolute consistency.

Certain embodiments of the present disclosure may provide a solution to this or other problems associated with relocating mainframe batch processes. Certain embodiments start with the premise that batch processing should be configured to "travel" with the application. One option involves converting batch processing systems to real-time processing systems. However, converting batch processing systems to run in real time would be highly disruptive in large-scale batch processing operations, such as operations that perform many hundreds of thousands of batch processing jobs. For example, although certain portions of the system (such as the mainframe itself) may support real-time processing, other portions of the system (such as file senders) may require significant re-working to convert to a real-time model. Converting batch processing systems to run in real time assumes that the owning applications are capable of delivering mainframe processes instead of batch processing files. Thus, another option may be desirable. In particular, certain embodiments of the present disclosure redirect batch processing files to a resilient transformation platform to transform the batch processing files to mainframe processes and reconcile for certainty. Certain embodiments of this batch transformation system ingest files from current applications, use software to convert the files to transactions or database updates, and deliver the transactions or database updates to the real time system of access or system of record.

System Overview

FIG. 1 is a schematic diagram of a mainframe processing system 100, in accordance with certain embodiments. In one embodiment, mainframe processing system 100 comprises one or more data sources 102 (e.g., data source 102a, data source 102b, ... data source 102n), a process transformation manager 110, a traffic manager 124, log manager 126, and a plurality of sites 130 (e.g., first site 130a and second site 130b). In general, data sources 102 send batch processing data to process transformation manager 110. Process transformation manager 110 transforms the batch processing to mainframe processes. For each mainframe process, traffic manager 124 determines whether to route the mainframe process to the first site 130a or to the second site 130b and then routes the mainframe process accordingly. Traffic manager 124 may determine the routing based at least in part on system status, as further discussed below. A mainframe 132 associated with a site 130 processes the mainframe processes received by that site 130.

Data Source

Examples of a data source 102 include, but are not limited to, a server, a computer, or any other suitable type of computing device. Data source 102 may comprise an interface, processing circuitry (such as one or more processors), and/or memory. Examples of an interface, processing circuitry, and memory are further described below with respect to FIG. 3. The processing circuitry facilitates obtaining or generating batch processing data, and the interface facilitates communicating the batch processing data from data source 102 to process transformation manager 110. As an example, the batch processing data may comprise a plurality of files. Each file may comprise a plurality of batch processes indicating a group (a batch) of processes to be processed together. Each batch process may be indicated by a respective record in the batch processing data (such as a row in a batch file or batch job). In certain embodiments, the file may include a large number of batch processes (such as thousands of batch processes). In certain embodiments, different data sources 102 may be associated with different organizations, such as third-party organizations distinct from the organization that processes the batch processing data. The different data sources 102 may use different formats for their respective batch files, depending on considerations such as the type of batch process indicated in the batch file or the preferences of the organization that is the source of the batch file.

Process Transformation System

Examples of a process transformation manager 110 include, but are not limited to, a server, a computer, or any other suitable type of computing device. Process transformation manager 110 may comprise an interface, processing circuitry (such as one or more processors), and/or memory. Examples of an interface, processing circuitry, and memory are further described below with respect to FIG. 3. The processing circuitry facilitates transforming batch processing data to a plurality of mainframe processes, and the interface facilitates sending the plurality of mainframe processes to traffic manager 124 for delivery to an appropriate site 130 comprising a mainframe 132.

In certain embodiments, process transformation manager 110 comprises a landing zone engine 112, transformation engine 114, logging engine 116, validation engine 118, publishing engine 120, and data processing request engine 122. These engines may be integrated or separated any suitable manner. Moreover, one or more engines may be omitted and/or other engines may be added, depending on the embodiment. Landing zone engine 112 receives batch processing data from one or more data sources 102. Landing zone engine 112 may provide a secure space to receive the batch processing data, validate the batch processing data, and send an acknowledgement of receipt to the one or more data sources 102. Landing zone engine 112 accepts file formats used by senders 102. Thus, certain embodiments of the solution proposed herein allow for transforming batch processing data while allowing data sources 102 to continue sending the batch processing data according to the format that they are accustomed to using (the solution need not disrupt the data sources 102).

Transformation engine 114 transforms the batch processing data. For example, transformation engine 114 extracts each batch process from a batch file and transforms each batch process into a separate mainframe process. The mainframe process may represent a transaction request or database update. Each mainframe process may be formatted such that it may be routed in real time. For example, if a first site 130a to which the mainframe process would ordinarily be routed is down, the mainframe process can be re-routed to a second site 130b in real time. In certain embodiments, transformation engine 114 comprises an entry, transformation, load (ETL) platform. Certain embodiments may be capable of accepting any type of file and generating any type of output. As an example, certain embodiments may transform or replace files formatted for batch processing by a mainframe 132, such as z/OS (an operating system for IBM z/Architecture mainframes), with mainframe processes formatted for real-time processing by the mainframe 132. For example, the mainframe (z/OS) file processing may be replaced with a real time processes aligned to Customer Information Control System (CICS), DB2 (e.g., a family of data management products, including database servers, developed by IBM), and/or Information Management System (IMS). There are a number of techniques available from single transactions to direct database updates. Examples include Java Database Connectivity (JDBC) and Open Database Manager (ODBM). In certain embodiments, transformation engine 114 transforms the batch processing data based on data transformation instructions, which may be stored in memory of process transformation manager 110.

Logging engine 116 may log the arrival of batch processing data (e.g., a batch file). The log may include any suitable details, such as arrival time of the batch processing data, the data source 102 that sent the batch processing data, the number of batch processes included in the batch processing data, and so on. In certain embodiments, logging engine 116 comprises software, such as an data hub extraction software, configured to extract data and/or metadata from the batch processing data. In certain embodiments, logging engine 116 may communicate the logs to log manager 126. Log manager 126 may comprise any suitable database, repository, memory, etc. for storing the logs. In certain embodiments, log manager 126 comprises software for searching, monitoring, and examining machine-generated Big Data (such as the logs) through a web-style interface. In an embodiment, log manager 126 captures, indexes, and/or correlates real-time data in a searchable container from which it can produce graphs, reports, alerts, dashboards, and visualizations. In an embodiment, log manager 126 comprises a Splunk database. The logs stored in log manager 126 may be used to reconcile the mainframe processes. For example, logging engine 116 may interact with log manager 126 to reconcile batch processes obtained from the batch processing data against mainframe processes completed by mainframes 132.

Validation engine 118 may receive mainframe processes (e.g., from transformation engine 114 or logging engine 116) and may validate the mainframe processes. Validating the mainframe processes may comprise checking for duplicates, checking for errors or inconsistencies, and so on. In certain embodiments, validation engine 118 may associate each mainframe process with identification information that facilitates monitoring the processing status of the mainframe process. As one example, validation engine 118 may comprise software that enables functionality such as creating, editing, scheduling, running, and/or monitoring ETL jobs, such as DataStage software.

Publishing engine 120 facilitates publishing events among components of mainframe processing system 100. In general, publishing engine 120 receives an event and publishes the event to one or more subscribers for that type of event. As an example, publishing engine 120 may receive an event (such as a request for a mainframe process that has passed validation from validation engine 118) and may publish the event to a data processing request engine 122. As another example, publishing engine 120 may receive an event (such as a reply that data processing request engine 122 sends in response to the request for the mainframe process) and may publish the event to logging engine 116. As another example, publishing engine may receive an event (such as an event comprising processing status information for a mainframe process received from mainframe 132) and may publish the event to logging engine 116. In this manner, logging engine 116 may receive information for reconciling the logs (e.g., replies from data processing request engine 122 and/or mainframe 132 may be captured and reconciled for logging, reporting, and certainty for senders). If logging engine 116 detects a discrepancy when reconciling the logs, such as detecting a mainframe process that was sent but not acknowledged or processed within an expected time period, logging engine 116 may take an action, such as notifying a system administrator (which may prompt manual intervention) or initiating a retry of the mainframe process. In certain embodiments, publishing engine 120 may use publish/subscribe software, such as Kafka.

Data processing request engine 122 receives requests for mainframe processes (e.g., via publishing engine 120), authorizes the requests, and/or dispatches the requests to traffic manager 124. In certain embodiments, data processing request engine 122 comprises an authorization application configured to send mainframe process requests as individual requests (e.g., as opposed to batches). In certain embodiments, data processing request engine 122 sends multi-threaded requests to traffic manager 124. Data processing request engine 122 may receive replies acknowledging requested mainframe processes from traffic manager 124 (which may in turn send requests to and receive replies from mainframes 132), and data processing request engine 122 may communicate the acknowledgements, for example, to logging engine 116 (e.g., via publishing engine 120).

Process transformation manager 110 may be configured to be highly scalable so that receiving the batch processing data, transforming the batch processing data to a plurality of mainframe processes (e.g., real-time processes), and dispatching the plurality of mainframe processes for processing by mainframes 132 matches the efficiency of mainframe batch processing.

Process transformation manager 110 may be configured off-platform from mainframes 132. For example, process transformation manager 110 may be configured in a redundant manner across multiple provisioning hubs. The provisioning hubs may be configured to be highly available (goal of 100% availability) with low risk of an outage. For example, the provisioning hubs may be geographically distributed so that an event that impacts one provisioning hub is unlikely to impact another provisioning hub. Process transformation manager 110 may be configured to be highly resilient (real-time architecture that can "travel"/relocate from one provisioning hub to another if needed).

Traffic Manager

Examples of a traffic manager 124 include, but are not limited to, a server, a computer, or any other suitable type of computing device. Traffic manager 124 may comprise an interface, processing circuitry (such as one or more processors), and/or memory. Examples of an interface, processing circuitry, and memory are further described below with respect to FIG. 3. The processing circuitry facilitates determining a routing for each of a plurality of mainframe processes, and the interface facilitates sending the plurality of mainframe processes to an appropriate site 130 comprising a mainframe 132. For example, traffic manager 124 delivers real-time requests for mainframe processes to the available instance of the destination mainframe application. In an embodiment, traffic manager 124 communicates with mainframe 132 via one or more interconnecting modules (such as one or more Sysplex distributors, Information Management System (IMS) Connect modules, IMS Message Processing Programs (MPPs), and/or other modules).

Mainframe Sites

In certain embodiments, a site 130 includes a datacenter configured to host one or more mainframes 132. A mainframe 132 may be configured as an application that runs at the site 132. The example mainframe processing system 100 illustrated in FIG. 1 comprises a first site 130a and a second site 130b. In an embodiment, the first site 130a may normally be configured to serve a first geographical area, such as the East Coast, and the second site 130 may normally be configured to serve a second geographical area, such as the West Coast. Each site 130 may be configured with an instance of a first mainframe 132a and a second mainframe 132b. Each mainframe 132 may be associated with an instance of a respective database 134 (e.g., first mainframe 132a may be associated with first database 134a, and second mainframe 132a may be associated with a second database 134b). Each database 134 may store mainframe configuration information or other data that facilitates processing of mainframe processes by mainframe 132.

First mainframe 132a may normally be configured to serve the East Coast, and second mainframe 132b may normally be configured to serve the West Coast. Accordingly, first mainframe 132a may be active in first site 130a (the East Coast site) and passive in second site 130b (the West Coast site). Second mainframe 132b may be active in second site 130b (the West Coast site) and passive in first site 130a (the East Coast site). A connection between the instance of first database 134a in first site 130a and the instance of first database 134a in second site 130b allows for synchronizing the contents of these databases (to provide redundancy/prepare for the possibility of having to relocate mainframe 132a). A connection between the instance of second database 134b in first site 130a and the instance of second database 134b in second site 130b allows for synchronizing the contents of these databases (to provide redundancy/prepare for the possibility of having to relocate mainframe 132b).

Traffic manager 124 receives a mainframe process and determines whether to route the mainframe process to the first site 130a or the second site 130b. During normal operation, traffic manager 124 routes mainframe processes for the East Coast to first site 130a (the East Coast site, which runs the active instance of the East Coast mainframe, first mainframe 132a). During normal operation, traffic manager 124 routes mainframe processes for the West Coast to second site 130b (the West Coast site, which runs the active instance of the West Coast mainframe, second mainframe 132b).

Traffic manager 124 monitors the system status of first site 130a and second site 130b. For example, each site 130 may be associated with a respective Uniform Resource Locator, and traffic manager 124 may periodically check the URL to determine if that site 130 is available/up or unavailable/down. Certain embodiments verify the system status of the destination site/mainframe application prior to commencing a transaction request.

Suppose a weather event on the East Coast causes first site 130a to go down. As a result, first mainframe 132a and first database 134a may be relocated to second site 130b (e.g., the status of first mainframe 132a and first database 134a at second site 130b goes from passive to active). Second site 130b may be available to process mainframe processes for the East Coast (in addition to continuing to process mainframe processes for the West Coast because the instances of the second mainframe 132b and second database 134b remain active in second site 130b). While first site 130a is down, traffic manager 124 may in real-time re-route mainframe processes that would have normally gone to first site 130a (East Coast transactions) to instead go to second site 130b.

Traffic manager 124 may send mainframe processes to the available site(s) 130 synchronously or asynchronously. In the synchronous approach, the traffic manager 124 may wait for mainframe 132 to accept a request to process the mainframe process before delivering the mainframe process to mainframe 132. In the asynchronous approach, the traffic manager 124 may deliver the mainframe process to mainframe 132 without having to send a request in advance or waiting for mainframe 132 to accept. In either case, mainframe 132 may report when the mainframe process has been processed. The report may indicate whether processing was successful or whether an exception occurred.

In certain embodiments, logging engine 116 captures the transaction completion information to reconcile back to identification information (such as file trailers) associated with the batch processes of the batch processing data. In certain embodiments, transaction failures will trigger alerts to a logging and monitoring capability, which may be provided by log manager 126. Optionally, the alerts can be configured based on a tolerance, such as a threshold indicating how many exceptions can occur before triggering an alert. As an example, the tolerance may be set to zero to cause an alert to be generated for every exception. As another example, the tolerance may be set to 1%. For example, if a data source 102 has a history of sending data with certain inaccuracies that about 1% of the time trigger false-positives (e.g., exceptions that are not of concern), the tolerance may be set to 1% to limit over-reporting of exceptions. After transmitting all batch processes associated with a batch file as mainframe processes and processing the replies, logging engine 116 may generate a reconcilement summary. The reconcilement summary may be sent to a logging and monitoring capability, such as log manager 126. A daily scorecard consisting of expected file requests and execution statistics can be configured and processed as a control.

Network

The components of mainframe processing system 100 may be communicatively coupled via one or more networks. A network may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. A network may be configured to support any suitable type of communication protocol as would be appreciated by one of ordinary skill in the art.

Example Steps Performed by the Mainframe Processing System

The components of mainframe processing system 100 may perform any suitable steps and communicate any suitable messages to facilitate the functionality described. As one example, certain embodiments include the following:

1. Data source 102 redirects batch processing data (e.g., a batch file) to a landing zone engine 112 outside mainframe 132.
2. Landing zone engine 112 validates the integrity of the batch processing data.
3. Logging engine 116 generates a log to trace the batch processing data (e.g., whether transformation and processing was successfully initiated, or whether the batch file was rejected for failure).
4. Transformation engine 114 reformats detail batch processes (e.g., processes extracted from records obtained from the batch file) to a plurality of mainframe processes (e.g., transaction requests or database updates).
5. Traffic manager 124 receives the plurality of mainframe processes from process transformation manager 110 (e.g., after progressing through the various engines of process transformation manager 110 described above) and delivers the mainframe processes to the mainframe 132 system of access (SOA).
6. Mainframe 132 SOA processes the mainframe processes normally and replies.
7. Process transformation manager 110 aggregates the reply information for reconciling to file trailers and writes to logs if an exception occurs.
8. Logging engine 116 creates or updates a log for traceability once replies have been received for all mainframe processes (or a time expires) to indicate completion of the mainframe processes or an exception process.

These steps may allow for transforming mainframe processes received from data sources 102 in a batch format. While the mainframe 132 supports ingesting the mainframe processes in the batch format provided by data sources 102, the batch format presents challenges in the event that the mainframe 132 needs to be re-located (particularly if the relocation must occur on short notice, for example, due to a weather event). For example, relocating the mainframe 132 in the middle of batch processing can cause unpredictable behavior requiring manual review, repair, and restart. Given the large number of the batch files and the large number of batch processes in each batch file, these efforts can be significant.

To address this problem, certain embodiments receive the mainframe processing data from data sources 102 (e.g., in the same batch format that data sources 102 already use), and instead of putting that mainframe processing data straight into the mainframe 132, add a middle layer to convert from mainframe-batch format to mainframe, real-time format (such as IMS format), which is a more complex protocol. Batch processing data and real-time mainframe processes are not directly compatible. For example, a batch file is often formatted somewhat like a spreadsheet with numbers and/or characters arranged in rows and columns. There can potentially be millions of data elements in a batch file. Mainframe, real-time format cannot send data in that format. Thus, certain embodiments provide an envelope to transform each batch process in the batch file into a separate, real-time data processing transaction. As part of the transformation, characters may need to be translated from one protocol (e.g., ASCII) to another protocol (e.g., EBCDIC). A series of software adapters, connection points, validation points, and security checks may be used to ensure proper transformation of the mainframe data process. For simplicity, the transformation may be thought of as converting one request comprising N processes (processes to be performed as a batch) to N individual requests comprising one process each.

Certain embodiments create threads for the mainframe processes and spawn enough threads to allow the mainframe 132 to complete processing of the N mainframe processes in approximately the same amount of time that the mainframe 132 would have taken to complete processing of the original batch file. Batch file processing is very efficient and optimized to process large amounts of data, so an advantage of the embodiments of the present disclosure is providing a scalable architecture to allow the real-time mainframe processes to match the efficiency of batch file processing. Certain embodiments receive mainframe processing data that is processible in one form (batch file), transform the mainframe processing data to a plurality of mainframe processes, and manage delivery of the mainframe processes at scale to maintain high availability of the mainframe 132.

In certain embodiments, after sending a request and receiving a reply, the process transformation manager 110 reconciles the results, for example, by comparing a number of batch processes sent to landing zone engine 112, a number of mainframe processes processed, a number of successes, a number of failures, etc. If an individual transaction failed, data process transformation manager 110 can flag it.

Data Transformation and Routing Process

Figure 2A:
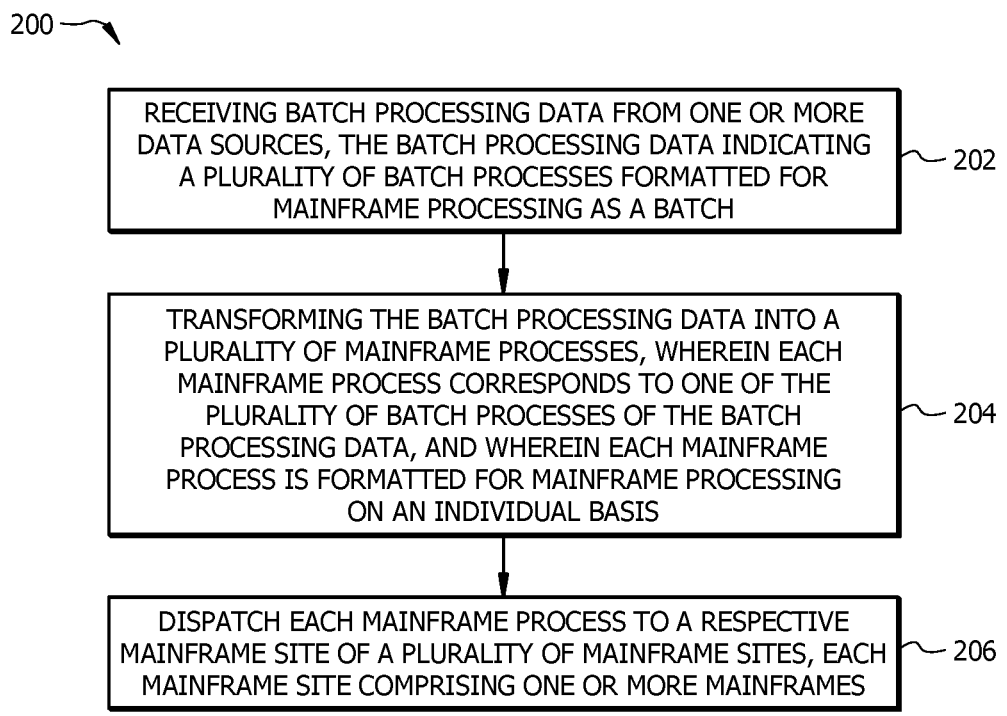
FIG. 2A is a flowchart of a process for transforming mainframe batch processes to mainframe processes in a mainframe processing system, in accordance with certain embodiments.
Figure 2B:
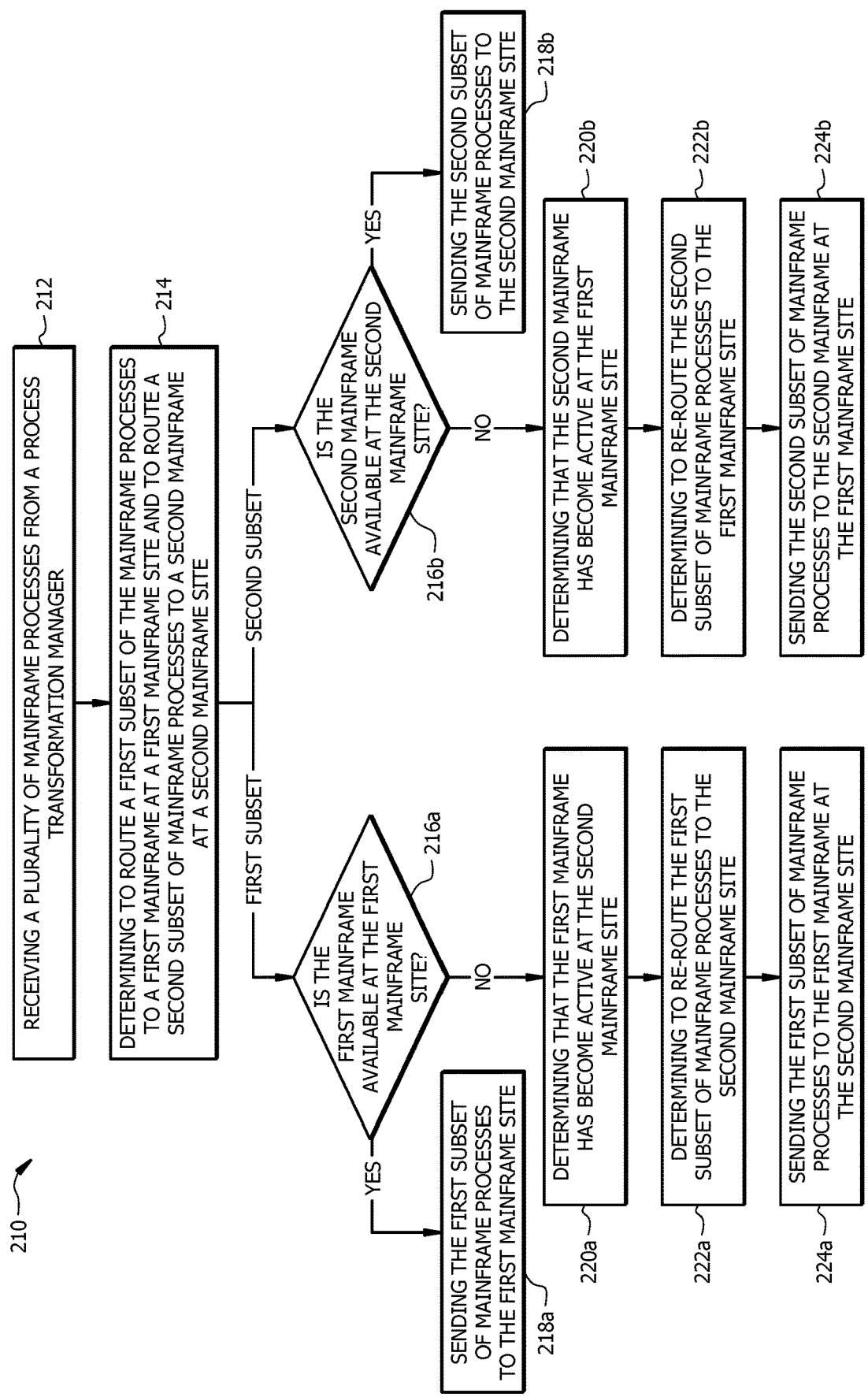
FIG. 2B is a flowchart of a process for routing mainframe processes in a mainframe processing system, in accordance with certain embodiments.

FIGS. 2A-2B are flowcharts of processes for transforming and routing mainframe batch processes, in accordance with certain embodiments. In certain embodiments, the processes may be performed by one or more components of the mainframe processing system 100 described with respect to FIG. 1. For example, FIG. 2A illustrates a process 200 for transforming mainframe batch processes to mainframe processes that may be performed by process transformation manager 110 of FIG. 1. FIG. 2B illustrates a process for routing mainframe processes that may be performed by traffic manager 124 of FIG. 1.

In FIG. 2A, method 200 begins at step 202 with receiving batch processing data from one or more data sources 102. The batch processing data indicates a plurality of batch processes formatted for mainframe processing as a batch. Method 200 proceeds to step 204 with transforming the batch processing data into a plurality of mainframe processes. The transforming may be based on data transformation instructions, which may be stored in memory associated with process transformation manager 110. Each mainframe process corresponds to one of the plurality of batch processes of the batch processing data received in step 202. Each mainframe process is formatted for mainframe processing on an individual basis. For example, mainframe 132 may process a mainframe process independently of the other mainframe processes. Thus, if mainframe 132 becomes unavailable at one mainframe site 130 part way through processing the mainframe processes associated with the batch, the remaining mainframe processes from the batch can be re-routed to another mainframe site 130 (a relocation site where the mainframe 132 has become active).

Certain embodiments transform the batch processing data by extracting a first batch process from the batch processing data, translating the first batch process from a first protocol to a second protocol, and insert the translated first batch process in an envelope to yield a first of the mainframe processes. The envelope facilitates real-time routing of the first batch process to the respective mainframe site. In certain embodiments, translating the first batch process comprises translating from a first information format protocol (such as ASCII) to a second information format protocol (such as EBCDIC). In certain embodiments, translating the first batch process comprises translating from a first mainframe protocol (such as a batch file-based protocol) to a second mainframe protocol (such as a real-time protocol, e.g., IMS). The process may be repeated for each batch process contained in the batch processing data.

At step 206, method 200 dispatches the mainframe processes to facilitate routing each mainframe process to a respective mainframe site 130 of a plurality of mainframe sites 130 (e.g., mainframe sites 130a and 130b). Each mainframe site 130 comprises one or more mainframes 132. For example, process transformation manager 110 dispatches mainframe processes to traffic manager 124, and traffic manager 124 routes the mainframe processes (e.g., as described with respect to FIG. 2B).

In certain embodiments, method 200 may comprise any additional steps to provide the features of process transformation manager 110 described above. As an example, in certain embodiments, method 200 further comprises receiving processing status information. The processing status information indicates whether mainframe 132 successfully processed a particular mainframe process or whether the mainframe process failed. Processing status information may indicated a failed mainframe process explicitly (e.g., mainframe 132 indicates an error occurred when processing the mainframe process) or implicitly (e.g., failure to receive confirmation of successful processing within a pre-determined time period). In response to the failed mainframe process, certain embodiments automatically restart or repair the failed mainframe process.

In certain embodiments, method 200 further comprises generating one or more logs. For example, method 200 may generate one or more logs described above with respect to logging engine 116. One or more logs may be generated based on the batch processing data. For example, one or more logs may indicate a number of the plurality of batch processes formatted for mainframe processing as the batch, such as the number of batch processes received in a batch file. For each batch process, the log may include identification information associated with the batch process.

In certain embodiments, method 200 receives processing status information indicating the mainframe processes for which the one or more mainframes 132 have completed processing. Method 200 may determine whether all of the mainframe processes have been completed based at least in part on reconciling the processing status information with one or more logs generated from the batch processing data. As an example, reconciling may comprise comparing whether the number of batch processes in the batch processing data matches the number of mainframe processes processed by mainframe 132. As another example, reconciling may comprise using the identification information to determine the processing status of each batch process in the batch processing data. In response to determining that one or more of the mainframe processes has not been completed within a pre-determined time period (which may be determined based on expiry of a timer or determined implicitly based on receipt of an indication that the mainframe process failed), method 200 may generate an exception. Method 200 may take any suitable action in response to the exception, such as updating statistics, alerting a system administrator, initiating a restart or a repair, and/or other action.

In certain embodiments, method 200 further comprises dynamically increasing or decreasing an amount of computing resources used in parallel by the process transformation manager 110 based on a size of the batch processing data. For example, when the number of batch processes to be received, transformed, and/or dispatched by process transformation manager 110 increases, the amount of computing resources used in parallel by process transformation manager 110 increases. When the number of batch processes to be received, transformed, and/or dispatched by process transformation manager 110 decreases, the amount of computing resources used in parallel by process transformation manager 110 decreases. Examples of computing resources may include threads spawned by process transformation manager 110. More threads may be spawned as needed, and multiple threads may be spawned at the same time or at overlapping times. In this manner, process transformation manager 110 may be scaled to maintain high availability and provide processing efficiency similar to batch processing.

In certain embodiments, process transformation manager 110 is configured off-platform from the one or more mainframes 132. For example, processes transformation manager 110 may comprise one or more processors (e.g., one or more processors configured to transform the batch processing data and dispatch the mainframe processes), and the one or more processors are external to and distinct from the mainframe site 130. Suppose the mainframe 130 comprises a datacenter that hosts the mainframe 132. The one or more processors may be located outside the datacenter. Thus, hardware used to run mainframes 132 would not be used to run the process transformation manager 110. Optionally, process transformation manager 110 may be geographically separated from mainframe sites 130. Process transformation manager 110 itself is configured according to a real-time architecture. As discussed above, a real-time architecture facilitates high availability (such as 100% or nearly 100% availability) because, unlike mainframe processing, real-time processing can "travel" relatively easily in the event that relocation is required. In this manner, process transformation manager 110 may have good resiliency and sufficient availability to receive batch processing data, transform the batch processing data to a plurality of mainframe processes, and send the mainframe processes (e.g., process transformation manager 110 can be designed to keep pace with the amount of batch processing data sent by data sources 102).

Turning to FIG. 2B, method 210 begins at step 212 with receiving a plurality of mainframe processes from the process transformation manager 110. Method 210 proceeds to step 214 with determining a routing for each mainframe process. In certain embodiments, method 210 determines a first subset of the plurality of mainframe processes to route to a first mainframe 132a at a first mainframe site 130a. For example, method 210 may be configured to normally route mainframe processes for the East Coast to an East Coast site (a mainframe site 130a that normally runs an active instance of an East Coast mainframe 132a). In certain embodiments, method 210 determines a second subset of the plurality of mainframe processes to route to a second mainframe 132b at a second mainframe site 130b. For example, method 210 may be configured to normally route mainframe processes for the West Coast to a West Coast site (a mainframe site 130b that normally runs an active instance of a West Coast mainframe 132b).

From here, the example method 210 shown in FIG. 2B diverges into two paths, and "a" path for the first subset of the plurality of mainframe processes (steps 216a-224a), and a "b" path for the second subset of the plurality of mainframe processes (steps 216b-224b). The "a" path is discussed first. At step 216a, method 210 determines whether the first mainframe 132a is available at the first mainframe site 130a. For example, method 210 may determine that first mainframe 132a is available if first mainframe site 130a is up and/or first mainframe 132a is active. Otherwise, if first mainframe site 130a is down (or significantly degraded) or first mainframe 132a is in a passive, down, or significantly degraded state, method 210 may determine that first mainframe 132a is unavailable. Certain embodiments determine availability based on a system status check, such as based on checking a URL associated with the first site 130a prior to sending the first subset of mainframe processes.

If at step 216a first mainframe 132a is available at first mainframe site 130a, method 210 proceeds to step 218a. At step 218a, method 210 sends/routes the first subset of the plurality of mainframe processes to first mainframe 132a at first mainframe site 130a. First mainframe 132a is configured to receive the first subset of the plurality of mainframe processes (e.g., from traffic manager 124) and to process the first subset of the plurality of mainframe processes.

Otherwise, if at step 216a first mainframe 132a is unavailable at first mainframe site 130a, method 210 skips step 218a and proceeds to step 220a. At step 220a, method 210 determines that the first mainframe 132a has become active at the second mainframe site 130b of the plurality of mainframe sites (e.g., 130a and 130b). At step 222a, method 210 determines to re-route the first subset of the plurality of mainframe processes to the second mainframe site 130b. At step 224a, method 210 sends/routes the first subset of the plurality of mainframe processes to the second mainframe site 130b (e.g., for processing by the now-active instance of first mainframe 130a).

For ease of explanation, FIG. 2B shows each mainframe process in the first subset being handled in the same way (e.g., all routed normally or all re-routed based on the destination mainframe 132 being re-located). However, it is possible for different mainframe processes in the same subset (e.g., the first subset) to be routed differently based on a change in system status. For example, suppose that when method 210 begins, the first mainframe site 130a is up. Suppose first, second, and third mainframe processes from the first subset of mainframe processes are sent to the first mainframe site 130a. Further suppose that after sending the third mainframe process from the first subset of mainframe processes, the first mainframe site 130a goes down. The remaining mainframe processes of the first subset (e.g., fourth, fifth, . . . and Nth mainframe processes from the first subset) may be re-routed to the second mainframe site 130b (the mainframe site 130 for the now-active instance of first mainframe 132a). Of course, if the first mainframe site 130a were to come back up in the middle of processing the remaining mainframe processes, re-routing back to the first mainframe site 130a is possible.

Turning to the "b" path of FIG. 2B, at step 216b, method 210 determines whether the second mainframe 132b is available at the second mainframe site 130b. If at step 216b second mainframe 132b is available at second mainframe site 130b, method 210 proceeds to step 218b. At step 218b, method 210 sends/routes the second subset of the plurality of mainframe processes to second mainframe 132b at second mainframe site 130b. Second mainframe 132b is configured to receive the second subset of the plurality of mainframe processes (e.g., from traffic manager 124) and to process the second subset of the plurality of mainframe processes.

Otherwise, if at step 216b second mainframe 132b is unavailable at second mainframe site 130b, method 210 skips step 218b and proceeds to step 220b. At step 220b, method 210 determines that the second mainframe 132b has become active at the first mainframe site 130a of the plurality of mainframe sites (e.g., 130a and 130b). At step 222b, method 210 determines to re-route the second subset of the plurality of mainframe processes to the first mainframe site 130a. At step 224a, method 210 sends/routes the second subset of the plurality of mainframe processes to the first mainframe site 130a (e.g., for processing by the now-active instance of second mainframe 132b).

For ease of explanation, FIG. 2B shows each mainframe process in the second subset being handled in the same way (e.g., all routed normally or all re-routed based on the destination mainframe 132 being re-located). As with the first subset, it is possible for different mainframe processes in the same subset (e.g., the second subset) to be routed differently based on a change in system status.

Although FIG. 2B describes an example using two mainframe sites 130a and 130b and two mainframes 132a and 132b, other embodiments may use other configurations. As an example, one embodiment may only configure a single mainframe 132 in two sites (e.g., an active instance in a first mainframe site 130a, and a backup/passive instance in a second mainframe site 130b). In this embodiment, all mainframe processes may be routed to the first mainframe site 130a unless a problem occurs (e.g., first mainframe site 130a down due to a weather event), in which case the active instance of the single mainframe 132 may be re-located to the second mainframe site 130b and all mainframe processes may be re-routed to the second mainframe site 130b. For such a scenario, FIG. 2B may be modified such that the first subset comprises all mainframe processes (e.g., all mainframe processes may follow the "a" path, and the "b" path may be omitted in the case of a single mainframe 132). As another example, certain embodiments may configure three, four, or more mainframe sites 130 and/or three, four, our more mainframes 132. The ratio of mainframes 132 per mainframe site 130 may be any suitable number, depending on the embodiment. Instances of a particular mainframe may be configured at two, three, four, or more mainframe sites 130. A mainframe site 130 may be configured with one, two, three, or more distinct mainframes 132 (e.g., mainframe 132a, 132b, . . . and/or 132n).

Hardware Configuration

Figure 3:
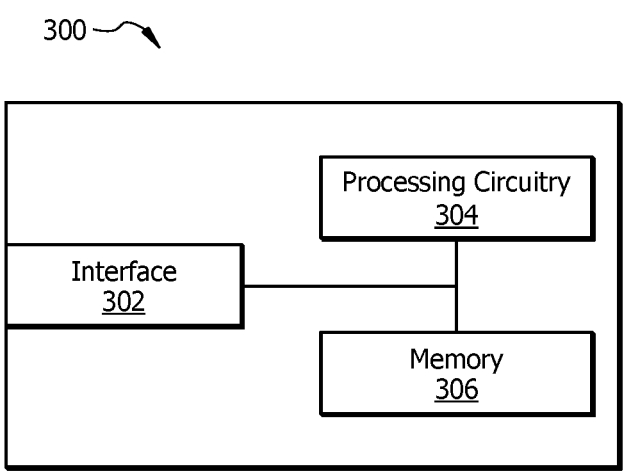
FIG. 3 is a schematic diagram of a hardware configuration for a component of the mainframe processing system, in accordance with certain embodiments.

FIG. 3 is an embodiment of a hardware configuration 300 that may be used in implementing data source 102, process transformation manager 110, traffic manager 124, log manager 126, or site 130 described above with respect to FIG. 1, or in implementing a component of the preceding (such as one or more of the engines of process transformation manager 110, or mainframe 132 and/or database 134 of site 130). As an example, hardware configuration 300 comprises interface 302, processing circuitry 304, and memory 306. Hardware configuration 300 may be configured as shown or in any other suitable configuration.

Processing Circuitry

The processing circuitry 304 comprises one or more processors operably coupled to the memory 306. The processing circuitry 304 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processing circuitry 304 may be a programmable logic device, a microcontroller, a microprocessor, or any suitable combination of the preceding. The processing circuitry 304 is communicatively coupled to and in signal communication with the memory 306 and the network interface 302. The one or more processors are configured to process data and may be implemented in hardware or software. For example, the processing circuitry 304 may be 8-bit, 16-bit, 32-bit, 64-bit, or of any other suitable architecture. The processing circuitry 304 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. As an example, with respect to process transformation manager 110, the one or more processors are configured to execute instructions to implement transformation of batch processing data to a plurality of mainframe processes. The landing zone engine 112, transformation engine 114, logging engine 116, validation engine 118, publishing engine 120, and/or data processing request engine 122 are configured to operate as described above, for example, with respect to FIG. 1. In an embodiment, an engine may be implemented using logic units, FPGAs, ASICs, DSPs, or any other suitable hardware. In certain embodiments, processing circuitry 304 of process transformation manager 110 may be configured to perform one or more steps described with respect to FIG. 2. As another example, with respect to traffic manager 124, the one or more processors are configured to execute instructions to implement routing the plurality of mainframe processes to a site 130, wherein traffic manager 124 selects site 130 based at least in part on a system status (e.g., perform a system status check and re-route the mainframe processes if site 130 is down). In this way, processing circuitry 304 may be a special-purpose computer designed to implement the functions disclosed herein.

Memory

The memory 306 is operable to store any of the information described above with respect to FIGS. 1-2 along with any other data, instructions, logic, rules, or code operable to implement the function(s) described herein when executed by the processing circuitry 304. The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM).

In certain embodiments, with respect to process transformation manager 110, memory 306 is operable to store batch processing data, data transformation instructions, logs, mainframe process requests, and/or any other data or instructions. In certain embodiments, with respect to traffic manager 124, memory 306 is operable to store routing instructions and/or any other data or instructions.

Network Interface

The network interface 302 is configured to enable wired and/or wireless communications. The network interface 302 is configured to communicate data between data sources 102, process transformation manager 110, traffic manager 124, log manager 126, sites 130, and other devices, systems, or domains. For example, the network interface 302 may comprise a near-field communication (NFC) interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processing circuitry 304 is configured to send and receive data using the network interface 302. The network interface 302 may be configured to use any suitable type of communication protocol as would be appreciated by one of ordinary skill in the art.

According to certain embodiments, a batch file can be released from its scheduling and constraints and the batch processes in the batch file can be transformed to mainframe processes that "travel" with the destination application to an available environment. Batch processing is a foundational element of mainframe applications. Batch processing is highly reliable and efficient when in a stable, fixed location. However, modern applications must be resilient across multiple geographically disbursed datacenters, and mainframe batch processing does not align to that pattern. Most organizations rely on a disaster site backup (active/cold) as mainframes have an excellent record of reliability. This has made a "cold" disaster site an acceptable risk over the years. However, there is an expectation that certain types of applications will always be available. Although the mainframe maintains availability as an unobtrusive, reliable workhorse during normal conditions, there is a possibility of a datacenter event (such as an outage). A datacenter event can have a big impact. Oftentimes, the mainframe acts as an organization's backbone by performing batch processes throughout the day (it does not simply run a batch process once per night). As an example, throughout the day, a financial institution may run large mainframe batch processes associated with memo-posting various financial transactions (payroll, bill pay, Automated Clearing House (ACH), etc.). The various financial transactions are continuously presented to the mainframe batch process to help manage account balances in real time. When the mainframe batch processing becomes unavailable, the customer experience is highly degraded.

Embodiments of the present disclosure address this problem. Continuing with the financial transaction example, certain embodiments accept batch files requesting updates to financial accounts (such as consumer checking and savings accounts), transform the batch files to individual mainframe processes sent to the mainframe, and reconcile replies to confirm that the number of mainframe processes processed by the mainframe matches the number of batch processes in the batch file.

Certain embodiments of the present disclosure lend themselves to mainframe systems that run large batch processes throughout the day. An example of such a mainframe system includes a consumer mainframe authorization system that runs batch-based memo-post files thousands of times per day, for example, as the source of checking and savings available balances and transaction histories. It is a priority to make such a mainframe system highly available (e.g., a goal of availability 100% of the time). While most real-time applications have been re-architected to be highly available, batch processing has previously been omitted from these "always on" strategies because of the complexity and constraints around bringing it along with an application that can move. Certain embodiments of the present disclosure facilitate transforming mainframe batch processing so that the mainframe can be used in these "always on" strategies.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § engine 112(f) as it exists on the date of filing hereof unless the words "means for" or "step for" are explicitly used in the particular claim.

The invention claimed is:

1. A mainframe processing system, comprising:
    a memory operable to store data transformation instructions; and
    one or more processors, at least one of the one or more processors operably coupled to the memory, the one or more processors configured to:
        receive batch processing data from one or more data sources, the batch processing data indicating a plurality of batch processes formatted for mainframe processing as a batch;
        transform the batch processing data into a plurality of mainframe processes based on the data transformation instructions, wherein:
            each mainframe process corresponds to one of the plurality of batch processes of the batch processing data;
            each mainframe process is formatted for the mainframe processing on an individual basis;
            the plurality of mainframe processes comprises a first mainframe process and a second mainframe process; and
            the first mainframe process is different from the second mainframe process;
        dispatch the first mainframe process each mainframe process to a first mainframe site, the first mainframe site comprising a first mainframe, a first database, a second mainframe, and a second database; and
        dispatch the second mainframe process to a second mainframe site, the second mainframe site comprising a third mainframe, a third database, a fourth mainframe, and a fourth database, wherein:
            the first mainframe and the fourth mainframe are configured to perform the first mainframe process;
            the second mainframe and the third mainframe are configured to perform the second mainframe process;
            the second mainframe is configured to provide first redundancy to the third mainframe;
            the second database is configured to provide second redundancy to the third database;
            the fourth mainframe is configured to provide third redundancy to the first mainframe; and
            the fourth database is configured to provide fourth redundancy to the first database.

2. The mainframe processing system of claim 1, wherein to transform the batch processing data, the one or more processors are further configured to:
    extract a first batch process from the batch processing data;
    translate the first batch process from a first protocol to a second protocol; and
    insert the translated first batch process in an envelope to yield a first of the plurality of mainframe processes, wherein the envelope facilitates real-time routing of the first batch process to the respective mainframe site.

3. The mainframe processing system of claim 1, the one or more processors further configured to:
receive processing status information indicating a failed mainframe process of the plurality of mainframe processes; and
automatically restart or repair the failed mainframe process.

4. The mainframe processing system of claim 1, the one or more processors further configured to:
determine a first subset of the plurality of mainframe processes to route to the first mainframe site, wherein the first mainframe site comprises the first mainframe in active mode;
determine that the first mainframe has become unavailable at the first mainframe site;
determine that the first mainframe has become active at the second mainframe site;
determine to re-route one or more remaining mainframe processes of the first subset to the second mainframe site; and
route the one or more remaining mainframe processes of the first subset to the second mainframe site.

5. The mainframe processing system of claim 1, the one or more processors further configured to dynamically increase or decrease, based on a size of the batch processing data, an amount of computing resources used in parallel to perform at least one of: receiving the batch processing data, transforming the batch processing data, and dispatching the plurality of mainframe processes.

6. The mainframe processing system of claim 1, wherein the one or more processors are further configured to:
generate one or more logs based on the batch processing data, the one or more logs indicating:
a number of the plurality of batch processes formatted for the mainframe processing as the batch; and
for each batch process, identification information associated with corresponding batch process.

7. The mainframe processing system of claim 1, wherein the one or more processors are further configured to:
receive processing status information indicating the plurality of mainframe processes for which one or more mainframes have completed processing;
determine whether all of the plurality of mainframe processes have been completed based at least in part on reconciling the processing status information with one or more logs generated from the batch processing data; and
generate an exception in response to determining that one or more of the plurality of mainframe processes has not been completed within a pre-determined time period.

8. The mainframe processing system of claim 1, the one or more processors further configured to:
determine a first subset of the plurality of mainframe processes to route to the first mainframe at the first mainframe site, and route the first subset of the plurality of mainframe processes to the first mainframe at the first mainframe site, the first mainframe configured to process the first subset of the plurality of mainframe processes.

9. The mainframe processing system of claim 1, wherein the one or more processors configured to transform the batch processing data and dispatch the plurality of mainframe processes are external to and distinct from the first mainframe site or the second mainframe site.

10. A mainframe processing method, comprising:
receiving, by one or more processors, batch processing data from one or more data sources, the batch processing data indicating a plurality of batch processes formatted for mainframe processing as a batch;
transforming, by the one or more processors, the batch processing data, the batch processing data transformed into a plurality of mainframe processes based on data transformation instructions, wherein:
each mainframe process corresponds to one of the plurality of batch processes of the batch processing data;
each mainframe process is formatted for the mainframe processing on an individual basis;
the plurality of mainframe processes comprises a first mainframe process and a second mainframe process; and
the first mainframe process is different from the second mainframe process;
dispatching, by the one or more processors, the first mainframe process to a first mainframe site, the first mainframe site comprising a first mainframe, a first database, a second mainframe, and a second database; and
dispatching, by the one or more processors, the second mainframe process to a second mainframe site, the second mainframe site comprising a third mainframe, a third database, a fourth mainframe, and a fourth database, wherein:
the first mainframe and the fourth mainframe are configured to perform the first mainframe process;
the second mainframe and the third mainframe are configured to perform the second mainframe process;
the second mainframe is configured to provide first redundancy to the third mainframe;
the second database is configured to provide second redundancy to the third database;
the fourth mainframe is configured to provide third redundancy to the first mainframe; and
the fourth database is configured to provide fourth redundancy to the first database.

11. The mainframe processing method of claim 10, wherein transforming the batch processing data comprises:
extracting a first batch process from the batch processing data;
translating the first batch process from a first protocol to a second protocol; and
inserting the translated first batch process in an envelope to yield a first of the plurality of mainframe processes, wherein the envelope facilitates real-time routing of the first batch process to the respective mainframe site.

12. The mainframe processing method of claim 10, further comprising:
receiving processing status information that indicates a failed mainframe process of the plurality of mainframe processes; and
automatically restarting or repairing the failed mainframe process.

13. The mainframe processing method of claim 10, further comprising:
determining, by the one or more processors, a first subset of the plurality of mainframe processes to route to the first mainframe site, wherein the first mainframe site comprises the first mainframe in active mode;
determining, by the one or more processors, that the first mainframe has become unavailable at the first mainframe site;

determining, by the one or more processors, that the first mainframe has become active at the second mainframe site;

determining, by the one or more processors, to re-route one or more remaining mainframe processes of the first subset to the second mainframe site; and routing, by the one or more processors, the one or more remaining mainframe processes of the first subset to the second mainframe site.

14. The mainframe processing method of claim 10, further comprising:

dynamically increasing or decreasing, based on a size of the batch processing data, an amount of computing resources used in parallel to perform at least one of: receiving the batch processing data, transforming the batch processing data, and dispatching the plurality of mainframe processes.

15. A non-transitory computer-readable medium storing instructions that when executed by a processor cause the processor to:

receive batch processing data from one or more data sources, the batch processing data indicating a plurality of batch processes formatted for mainframe processing as a batch;

transform the batch processing data into a plurality of mainframe processes, transforming being based on data transformation instructions, wherein:

each mainframe process corresponds to one of the plurality of batch processes of the batch processing data;

each mainframe process is formatted for the mainframe processing on an individual basis;

the plurality of mainframe processes comprises a first mainframe process and a second mainframe process; and the first mainframe process is different from the second mainframe process;

dispatch the first mainframe process to a first mainframe site, the first mainframe site comprising a first mainframe, a first database, a second mainframe, and a second database; and dispatch the second mainframe process to a second mainframe site, the second mainframe site comprising a third mainframe, a third database, a fourth mainframe, and a fourth database, wherein:

the first mainframe and the fourth mainframe are configured to perform the first mainframe process;

the second mainframe and the third mainframe are configured to perform the second mainframe process;

the second mainframe is configured to provide first redundancy to the third mainframe;

the second database is configured to provide second redundancy to the third database;

the fourth mainframe is configured to provide third redundancy to the first mainframe; and the fourth database is configured to provide fourth redundancy to the first database.

16. The non-transitory computer-readable medium of claim 15, wherein transforming the batch processing data comprises:

extracting a first batch process from the batch processing data;

translating the first batch process from a first protocol to a second protocol; and inserting the translated first batch process in an envelope to yield a first of the plurality of mainframe processes, wherein the envelope facilitates real-time routing of the first batch process to the respective mainframe site.

17. The non-transitory computer-readable medium of claim 15, wherein the instructions further cause the processor to:

receive processing status information that indicates a failed mainframe process of the plurality of mainframe processes; and automatically restart or repair the failed mainframe process.

18. The non-transitory computer-readable medium of claim 15, wherein the instructions further cause the processor to:

dynamically increase or decrease, based on a size of the batch processing data, an amount of computing resources used in parallel to perform at least one of: receiving the batch processing data, transforming the batch processing data, and dispatching the plurality of mainframe processes.

19. The non-transitory computer-readable medium of claim 15, wherein the instructions further cause the processor to:

generate one or more logs based on the batch processing data, the one or more logs indicating:

a number of the plurality of batch processes formatted for the mainframe processing as the batch; and for each batch process, identification information associated with corresponding batch process.

20. The non-transitory computer-readable medium of claim 15, wherein the instructions further cause the processor to:

receive processing status information indicating the plurality of mainframe processes for which one or more mainframes have completed processing;

determine whether all of the plurality of mainframe processes have been completed based at least in part on reconciling the processing status information with one or more logs generated from the batch processing data; and generate an exception in response to determining that one or more of the plurality of mainframe processes has not been completed within a pre-determined time period.

* * * * *